United States Patent [19]

Imazaike

[11] Patent Number: 4,568,206
[45] Date of Patent: Feb. 4, 1986

[54] RETAINER FOR BALL BEARING

[75] Inventor: Toshiyuki Imazaike, Habikino, Japan

[73] Assignee: Nichia Seimitsu Kogyo Co., Ltd., Osaka, Japan

[21] Appl. No.: 679,591

[22] Filed: Dec. 3, 1984

Related U.S. Application Data

[63] Continuation of Ser. No. 488,568, Apr. 25, 1983, abandoned.

[51] Int. Cl.⁴ ............................................. F16C 33/38
[52] U.S. Cl. .................................................. 384/530
[58] Field of Search ............... 384/523, 527, 528, 529, 384/530, 572, 578, 614, 623

[56] References Cited

U.S. PATENT DOCUMENTS 2,861,849 11/1958 Case ...................................... 384/527
3,944,307 3/1976 Bingle ................................... 384/576
4,262,979 4/1981 Kispert et al. ........................ 384/576

FOREIGN PATENT DOCUMENTS 1903578 7/1970 Fed. Rep. of Germany ...... 308/201
1385568 12/1964 France ................................ 308/201

Primary Examiner—Stuart S. Levy
Assistant Examiner—David Werner
Attorney, Agent, or Firm—Griffin, Branigan, & Butler

[57] ABSTRACT

A retainer for ball bearings includes mating plastic members (4,5) having undulating shape and adapted to accommodate a plurality of balls (3) therebetween. One of the mating plastic members (4) has a mating edge provided with recesses (9) formed therein adapted to accommodate corresponding protrusions (10) formed on the other mating plastic member (5). The plastic members (4,5) are secured together, preferably by ultrasonic welding.

8 Claims, 22 Drawing Figures

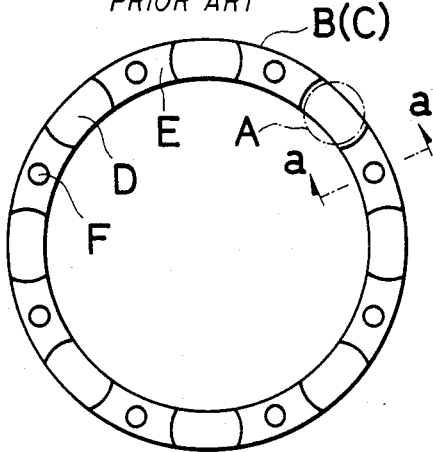
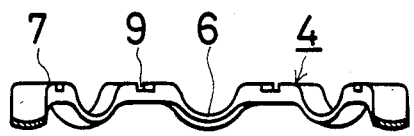
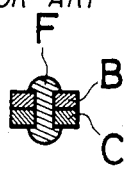
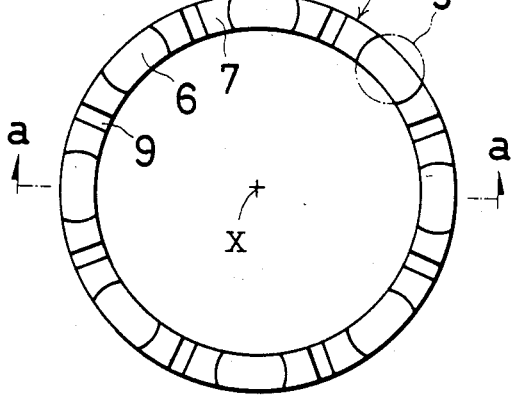
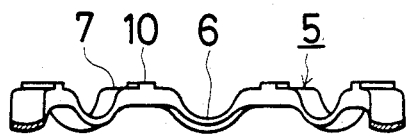
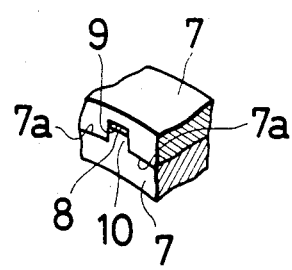

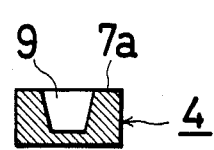
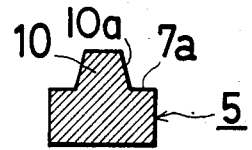
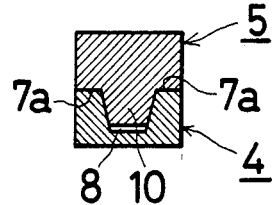
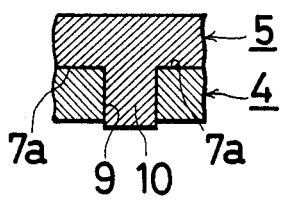
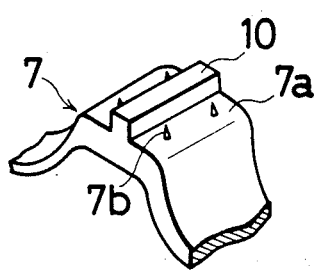
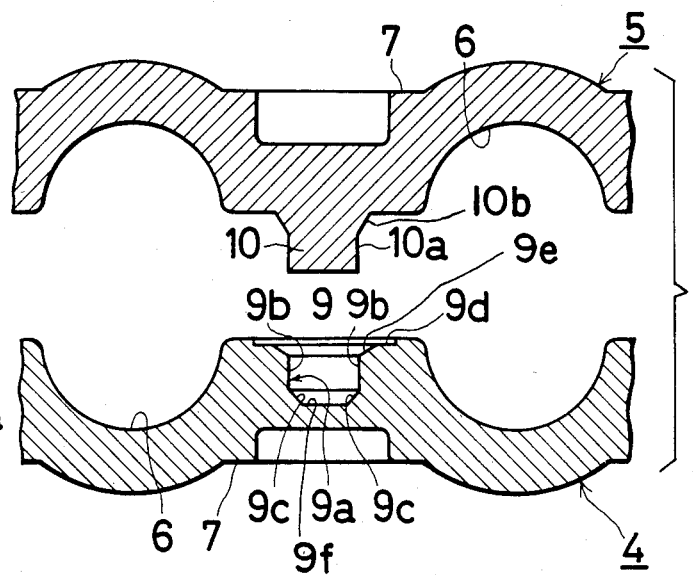
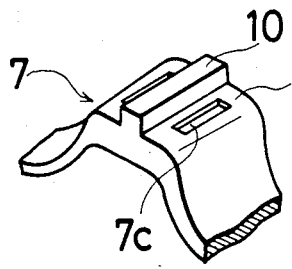
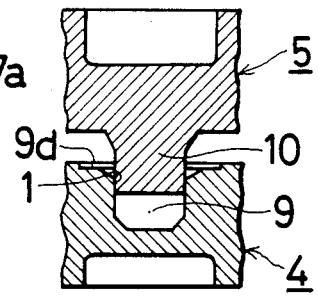
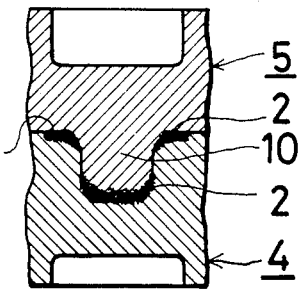

RETAINER FOR BALL BEARING

This is a continuation of application Ser. No. 06,488,568, filed Apr. 25, 1983, now abandoned.

BACKGROUND OF THE INVENTION

The present invention relates to an improved retainer for holding balls in a ball bearing and to a method of making the same.

Prior art retainers used to hold balls in ball bearings are usually made by a press-forming operation utilizing steel components. In accordance with the prior art method depicted in FIG. 1, metallic retainer pieces B and C are formed to have a generally undulating shape. Piece B (as well as mating piece C as indicated by the parenthetical reference numeral (C)) has a series of relatively flat portions E arranged in alternating sequence with a series of concave portions. Balls A are placed in the concave portions of the piece B (or piece C, as the case may be), the piece B (or the piece C) also being placed between inner and outer races (not shown) so that the balls A are held in position. Mating piece C (or piece B) is then placed on top of piece B (or piece C) with the concave portions of the two mating pieces aligned to form cavities D which accommodate the respective balls A. The retainer pieces B and C are then welded together at the flat portions E thereof or fastened together by caulked pins F as shown in FIG. 2.

Unfortunately, the conventional steel-made, wave-shaped retainers for ball bearings—whether assembled by welding or caulked pins as described above—suffer from several problems or deficiencies. For instance, a metal powder resulting from the welding operation or the caulking of the pins frequently sticks to a race surface (a surface of a groove of the race). Consequently, an extra step is required to wash away the metal powder.

Another problem occurs in the prior art methods in that an oxidized film is easily formed on race surfaces during the welding process, thereby preventing the balls from rolling smoothly. Moreover, assembly of the bearings in accordance with the prior art methods is a fairly time consuming process, especially the placement of the retainer pieces B and C in mating relation during the assembly process.

The conventional prior art methods unfortunately produce bearings which are noisy in use and bearings which are heavy.

In view of the foregoing, it is an object of the present invention to provide a retainer formed from an appropriate non-metallic material for use in retaining ball bearings.

An advantage of the present invention is the provision of a method of making retainers for ball bearings in which race surfaces are not contaminated during the manufacturing process.

Another advantage of the present invention is the provision of light-weight, silent retainers for ball bearings.

SUMMARY

A retainer for ball bearings includes mating plastic members having undulating shape and adapted to accommodate a plurality of balls therebetween. One of the mating plastic members has a mating edge provided with recesses formed therein adapted to accommodate corresponding protrusions formed on a mating edge of the other mating plastic member.

In some embodiments the recesses formed in the first member are slightly deeper than the height of the corresponding protrusions formed on the second member. In some embodiments the recesses include a tapered shoulder which leaves a channel when the retainer members are fitted together. In these embodiments the additional depth of the recess and the space provided by the tapered shoulder provides channels in which molten resin is contained during ultrasonic welding of the mating elements. Consequently, the molten resin does not overflow and a strong bond between the mating members is achieved.

In accordance with differing embodiments of the invention, the protrusions formed in the retaining members can take numerous forms such as, for example, cylinders, cones, truncated cones, rectangular pillars, or square pegs. The corresponding recesses on mating retaining members are accordingly appropriately formed.

BRIEF DESCRIPTION OF THE DRAWINGS

The foregoing and other objects, features, and advantages will be apparent from the following more particular description of preferred embodiments of the invention, as illustrated in the accompanying drawings in which like reference characters refer to the same parts throughout the different views. The drawings are not necessarily to scale, emphasis instead being placed on illustrating principles of the invention in a clear manner.

FIG. 1 is a plan view of a prior art metallic retainer for ball bearings;

FIG. 2 is a sectional view taken along the line a—a of FIG. 1;

FIG. 3 is a plan view of a plastic retainer member according to an embodiment of the present invention;

FIG. 4 is a sectional view taken along the line a—a of FIG. 3;

FIG. 5 is a plan view of a plastic retainer member which mates with the retainer member shown in FIG. 3;

FIG. 6 is a sectional view taken along the line a—a of FIG. 5;

FIG. 7 is a partial perspective view of a retainer showing the mating of retainer members according to the embodiment of FIGS. 3 through 6;

FIG. 14 is a sectional view of a first mating member according to another embodiment of the invention;

FIG. 15 is a sectional view of a second mating member in accordance with the embodiment of FIG. 14;

FIG. 16 is a sectional view illustrating the engagement of the mating members shown in FIGS. 14 and 15;

FIG. 17 is a sectioned partial view showing the engagement of mating members according to another engagement of the present invention;

FIG. 18 is a sectioned partial view of potentially mating members in accordance with another embodiment of the invention;

FIGS. 19 and 20 are partial perspective views of additional embodiments of the invention; and, FIGS. 21 and 22 are sectional views showing the engagement of mating members according to the embodiment of FIG. 18.

DETAILED DESCRIPTION OF THE DRAWINGS

Figure 8:
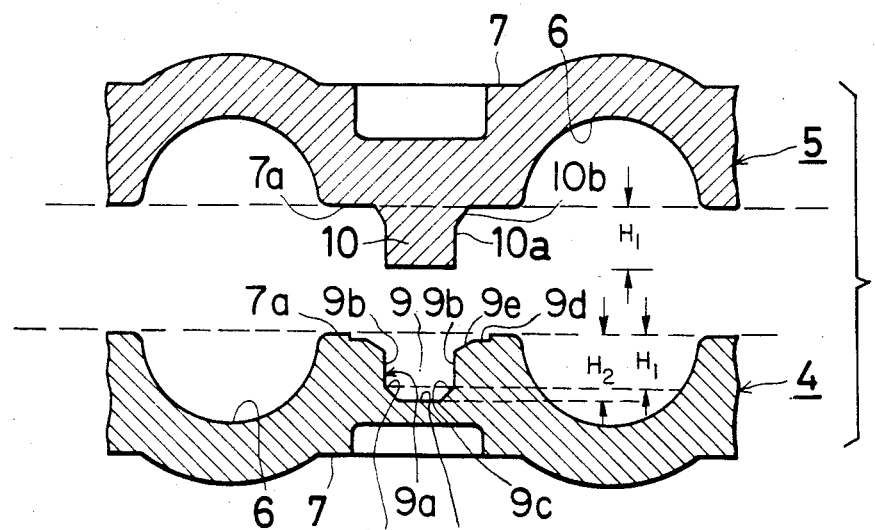
FIG. 8 is a sectioned partial view of mating member according to an embodiment of the invention.
Figure 9:
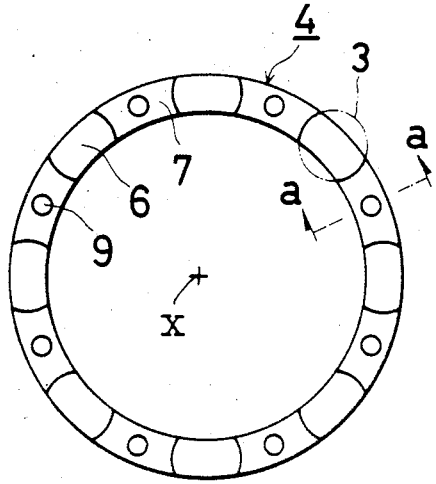
FIGS. 9 and 10 are plan views of respective mating members of another embodiment according to the present invention.
Figure 10:
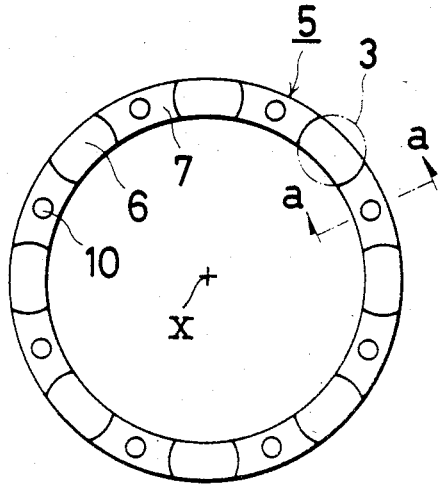
Figure 11:
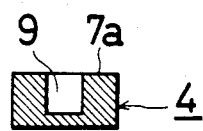
FIG. 11 is a sectional view taken along the line a—a of FIG. 9.
Figure 12:
FIG. 12 is a sectional view taken along the line a—a of FIG. 10.
Figure 13:
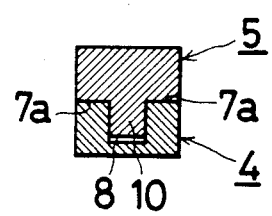
FIG. 13 is a sectional view illustrating the engagement of the retainer pieces shown in FIGS. 11 and 12.

FIGS. 3 and 4 show a retainer member 4 according to an embodiment of the invention while FIGS. 5 and 6 show a mating retainer member 5 according to the same embodiment. Retainer members 4 and 5 are substantially ring-shaped (as seen in FIGS. 3 and 5) and, as seen from the side (FIGS. 4 and 6), have a generally undulating pattern. Each of the retainer members 4 and 5 is made in a single molding step from a corrosion-resistant and wear-resistant engineering plastic, such as hard nylon, polyacetate, or the like.

The retainer members 4 and 5 as seen from above (FIGS. 3 and 5) are substantially ring-shaped members having inner and outer diameters taken with reference to a major axis X. The inner diameter of member 4 substantially equals the inner diameter of member 5; the outer diameter of member 4 substantially equals the outer diameter of member 5.

Retainer members 4 and 5 each have a plurality of substantially flat portions 7. Mating flat surfaces 7a of flat portions 7 lie in an imaginary plane which is perpendicular to the major axis X. A plurality of concave portions 6 are included in each of the members 4 and 5. Each concave portion 6 is positioned intermediate two flat portions 7. Each concave portion 6 forms a surface which defines a substantially semi-hemispherical cavity or trough. The cavity formed by concave portion 6 is said to be "semi-hemispherical" in that the narrow radial width of each member 4 and 5 (as determined by the difference between the outer and inner diameters of members 4 and 5) precludes the cavity formed therein from being a substantially hemispherical cavity. Flat portions 7 of members 4 and 5 are somewhat thicker along the dimension of axis X than the concave portions 6 thereof.

In accordance with various embodiments of the invention as described hereinafter, a recess is provided on the mating flat surface 7a of one or more flat portions 7 of retainer member 4. For example, with reference to the embodiment of FIGS. 3–7, an elongated grooved recess 9 is shown which is substantially square in cross-section. With respect to the same embodiment, a protrusion 10 is provided on the mating flat surface 7a of corresponding flat portions 7 of the mating flat retainer member 5. Protrusion 10 is in the shape of a pillar having a substantially square cross-section as seen along the dimension of axis X and a substantially rectangular shape as seen from above (see FIG. 5).

When the retaining members 4 and 5 are mated together, the mating surfaces of the retainer members 4 and 5 engage one another in such a manner that protrusion 10 is received into recess 9 as shown in FIG. 7. A plurality of protrusions 10 may be provided on the retainer member 5 as long as a corresponding plurality of recesses 9 are appropriately provided on the mating retainer member 4. Mating of the retainer members 4 and 5 also causes the concave portions 6 thereof to be correspondingly positioned to form a substantially semi-spherical cavity adapted to accommodate a ball. The term "semi-spherical" indicates that a substantially spherical cavity would be formed had the members 4 and 5 not had such narrow radial width (the difference between the outer and inner diameters of the members 4 and 5).

With respect to the embodiment of FIGS. 3–7, it should be understood that the recesses 9 on retainer member 4 and the protrusions 10 on retainer member 5 are shaped to have cross-sectional dimensions such that protrusions 10 are fittingly engaged by the recesses 9. While FIGS. 3–7 depict an embodiment wherein recesses 9 assume the shape of an elongated groove of square cross-section and wherein protrusions 10 have the shape of a rectangular pillar of square cross-section, other embodiments including those described hereinafter have recesses and protrusions shaped to fit in mating relationship in accordance with other cross-sectional configurations.

In the above respect, FIG. 8 depicts an embodiment wherein the recess 9 is formed by recess surfaces 9b, 9c, 9d, 9e, and 9f. In particular, the recess 9 is formed by recess surfaces 9b (which are substantially perpendicular to the edge of the imaginary plane represented by the broken lines in FIG. 8), surface 9f (which is substantially parallel to the imaginary plane), and surfaces 9c which connect the two opposing surfaces 9b in beveled fashion with the surface 9f. The recess 9 is also defined by recess surfaces 9d and 9e. As seen with respect to retainer member 4 in FIG. 8, recess surface 9d is substantially parallel to the edge of the imaginary plane containing mating flat surface 7a but is slightly recessed away therefrom to provide a gap between the surface 9d and the imaginary plane. The surfaces 9d are connected to the surfaces 9b by inclined or beveled surfaces 9e to form a tapered shoulder as shown in FIG. 8.

With further reference to the embodiment of FIG. 8, retainer member 5 has a protrusion 10 thereon which extends for a distance $H_1$ from the mating surface 7a (which lies in the imaginary plane the edge of which is indicated by the broken line) of retaining member 5. While the side surfaces 10a *protrusion 10 extend away from mating surface 7a* in substantially perpendicular fashion, base surfaces 10b of protrusion 10 connect side surfaces 10a to the retaining member 5 in substantially beveled fashion as shown in FIG. 8.

Concerning now the engaging relationship of the protrusion 10 into the recess 9, it can be seen from FIG. 8 that the surfaces 9b extend a distance $H_1$ away from the imaginary plane in which the mating surfaces 7a lie. The surface 9f, which is substantially parallel to the imaginary plane, is located a distance $H_2$ away from the imaginary plane, $H_2$ being a greater distance than $H_1$. Accordingly, when the protrusion 10 fits into the recess 9, the protrusion 10 extends into recess 9 only to a depth $H_1$, leaving unoccupied the most extreme portion of recess 9 defined partially by surfaces 9c and 9f. With respect to the mating relation of surface 10b of retaining member 5 and surface 9e of retaining member 4, it is to be noted that surface 10b is inclined at a greater angle with respect to the imaginary plane than is the surface 9e. Accordingly, a small gap or channel exists between surfaces 10b and 9e when members 4 and 5 are mated together. The gap which exists between protrusion 10 and surfaces 9c and 9f, as well as the gap between surface 10b and surfaces 9e and 9d, facilitate the ultrasonic welding of the members 4 and 5 as described hereinafter.

From the foregoing it should be understood that not all the flat mating surfaces 7a of retaining member 5 need have protrusions 10 formed thereon, and accordingly corresponding flat mating surfaces 7a of member 4 need not be provided with recesses 9. In this regard, in some embodiments only some rather than all of the flat surfaces 7a of the members 4 and 5 need be provided with recesses 9 and protrusions 10, respectively. It is preferable, however, that (for embodiments wherein recesses 9 and protrusions 10 are not provided on every mating surface 7a) the recesses 9 and protrusions 10 at least be provided on select flat mating surfaces 7a in a symmetrical fashion.

FIGS. 9–13 illustrate another embodiment of the present invention wherein recess 9 on retaining member 4 is a substantially cylindrical recess and protrusion 10 on retaining member 5 is a substantially cylindrical protrusion, the protrusions 10 being adapted for mating engagement with the recesses 9 much in the manner as the previously described embodiments.

FIGS. 14–16 illustrate a further embodiment of the present invention somewhat related to the embodiment of FIGS. 9–13. In this respect, rather than being substantially cylindrical, the protrusions 10 provided on retaining member 5 are substantially truncated cones. That is, rather than having side surfaces 10a which are substantially perpendicular to the flat mating surface 7a, the side surfaces 10a of protrusion 10 are inclined with respect to the surface 7a to give a conically tapered appearance. Recesses 9 in the retaining member 4 are accordingly shaped in appropriate female fashion to receive the male protrusion 10 of retaining member 5.

FIG. 17 depicts a further embodiment of the invention wherein a cylindrical recess 9 extends completely through the flat portion 7 of the retaining member 4. Protrusion 10 of the retaining member 5 is dimensioned to extend entirely through the recess 9 and to have a tip portion thereof protruding beyond the recess 9. In the embodiment shown in FIG. 17, the recess 9 is substantially cylindrical and the protrusion 10 is substantially cylindrical. Protrusion 10 has a greater length along the axis X than the recess 9 through which it extends.

FIG. 18 illustrates an embodiment of the invention akin to the embodiment of FIG. 8 but wherein the recess 9 and the protrusion 10 are substantially cylindrical rather than square or rectangular. It should be understood that similar dimensional aspects exist for FIG. 18 as discussed previously with respect to FIG. 8. For example, the dimensional relationships $H_1$ and $H_2$ are applicable to the structure of FIG. 18, as well as the angular relationships between the surfaces 10b and 9e. Thus, the embodiment of FIG. 18 (as well as the embodiment of FIG. 8) provides certain gaps between the protrusion 10 and the recess 9 to facilitate the channeling of the flow of molten resin during an ultrasonic welding operation.

Yet another embodiment of the present invention is illustrated in FIGS. 19 and 20, wherein either retainer member 4 and/or retainer member 5 have needle-shaped lugs or protrusions 7b formed thereon. The mating retainer member has shallow recesses 7c provided on the flat mating surface 7a thereof to accommodate the lugs 7b on a mating retainer member. As illustrated in FIGS. 19 and 20, the lugs 7b and recesses 7c are, at least in one embodiment, provided in addition to protrusions 10 such as those having shapes in accordance with any of the foregoing embodiments. It should be understood with respect to the embodiments of FIGS. 19 and 20 that the lugs 7b may be provided on some of the flat surfaces 7a of either the retainer member 4 or the retainer member 5 so long as the mating retainer member is appropriately adapted to receive lugs 7b in recesses 7c.

In assembling the retainer of the present invention, a predetermined number of balls 3 are inserted between inner and outer races (not shown) and retainer members 4 and 5 are mounted in mating relationship about the balls 3. In particular, protrusions 10 formed on retainer members 5 are inserted into corresponding recesses 9 in retainer member 4. When retainer members 4 and 5 are mated together in this manner, the balls 3 are accommodated in the cavity formed by the concave portion 6 of the members 4 and 5.

Once the members 4 and 5 are fit together in mating relationship, the members 4 and 5 are secured to one another, preferably by ultrasonic welding. In this regard, and with reference to the embodiment of FIG. 18, for example, surface 9b of retaining member is ultrasonically welded to the side surface 10a of retaining member 5 inasmuch as those surfaces are in contacting relationship. In addition, the flat mating surfaces 7a of the respective members 4 and 5 are welded together as well.

Molten resin which flows during the ultrasonic welding operation seeps into the various gaps which exist between the retaining members 4 and 5 and remains confined to the interior of the entire retainer structure rather than overflowing and escaping to contaminate either the balls or the race surfaces. In this respect, and still with reference to the embodiment of FIG. 18 as an example, the gap existing between the protrusion 10 and the surfaces 9c and 9f at the bottom of recess 9 becomes a channel into which molten resin may flow and wherein a connecting layer 2 is formed as shown in FIG. 22. Similarly, the gap existing between surfaces 10b of retainer member 5 and surfaces 9d and 9e of retainer member 4 accommodate molten resin also forming as a connecting layer 2. In this manner, the flowing molten resin is kept within the recess 9 and does not undesirably overflow to detract from the appearance or the operability of the ball bearing.

The embodiment of FIGS. 19 and 20 is similarly assembled. In particular, the shallow recess portion 7c shown in the member of FIG. 20 contains any residue of molten resin and prevents the resin from overflowing, thus offering the advantages of the related embodiments described above.

While the preferred method of making the retainers according to various embodiments of the invention involves ultrasonic welding of the members 4 and 5 together, it should be understood that the members 4 and 5 can be secured together by other means. For example, the members 4 and 5 can be secured together by the application of a suitable adhesive.

As described above, it can be seen that the present invention has numerous advantages. The retainer members 4 and 5 are manufactured from plastic by a single molding process so that the retainers according to various embodiments of the present invention are suitable for mass production. Moreover, the retainers are light in weight and can even be diverse in color.

As described hereinabove, the retainer members 4 and 5 have recesses 9 and protrusions 10, respectively, on their mating surfaces 7 thereof. Members 4 and 5 are mated together by inserting the protrusions 10 into the corresponding recesses 9. Accordingly, the retainer members 4 and 5 are easily aligned into desired mating positions by engaging the protrusions 10 with the recesses 9. The process of assembly therefore is quite simple and precise.

Furthermore, welding the retainer members 4 and 5 together once the protrusions 10 are inserted into recesses 9 results in a very strong bond that does not become undone during operation of the ball bearing.

The retainer of various embodiments of the invention, the balls 3 are automatically adjusted in positional relationship so that all the balls are placed at the same radial distance from the axis X of the retainer. In this respect, the automatic positional adjustment is accomplished merely by properly aligning the protrusions 10 with the corresponding recesses 9. Advantageously, since the retainer members 4 and 5 are fabricated from plastic, the frictional rubbing noises of the rolling balls are substantially reduced.

A further advantage results from the fact that the ultrasonic welding method of the present invention is quite simple so that the retainer pieces 4 and 5 are more easily connected together as compared to the welding or riveting operation required for conventional steel for metallic retainers. In addition, the surfaces of the race grooves of the inner and outer races in which the balls roll are kept clean and intact. Consequently, an additional cleaning process (which can be expensive and time consuming) is unnecessary.

The present invention is particularly suited to the manufacture of miniature ball bearings in which mating members do not have spacious contact surfaces at which they can be mated. Retainers formed in accordance with the present invention, on the other hand, provide additional contacting surface area through the usage of the recesses 9 (and consequently surfaces 9e and the like) and the protrusions 10 (with the side surfaces 10a) which may be welded together.

The retainers manufactured in accordance with the present invention are especially desirable since molten resin does not overflow to contaminate the balls or the race surfaces, and at the same time the recesses 9 and the protrusions 10 are strongly adhered together with the members 4 and 5 precisely aligned.

While the invention has been particularly shown and described with reference to preferred embodiments thereof, it will be understood by those skilled in the art that various alterations in form and detail may be made therein without departing from the spirit and scope of the invention.

The embodiments of the invention in which an exclusive property or privlege is claimed are defined as follows:

1. A retainer for a plurality of balls included in a ball bearing, said retainer comprising:
a first ring-like plastic member wherein a plurality of cavities are formed by surface adapted to accommodate a ball, each of said ball-accommodating surface of said first member being connected to a neighboring such surface by a substantially flat mating surface, said substantially flat mating surface being in a plane perpendicular to the major axis of said first ring-like element, a plurality of said substantially flat mating surfaces having a recess formed therein, wherein a first portion of said recess is substantially parallel to said mating surface and is recessed away from said mating surface to form a gap between said first recessed portion and said mating surface, wherein a second portion of said recess is adjacent to said first recess portion, said second recess portion being inclined at a first acute angle of inclination with respect to said mating surface;
a second ring-like plastic member wherein a plurality of cavities are formed by surfaces adapted to accommodate a ball, each of said ball-accommodating surfaces of said second member being connected to a neighboring such surface by a substanially flat mating surface, said substantially flat mating surface lying in a plane perpendicular to the major axis of said ring-like element; and,
a protrusion formed on a plurality of said substantially flat mating surfaces of said second ring-like plastic member, said protrusion having a first portion adjacent to said mating surface, said first protrusion portion being inclined at a second acute angle of inclination with respect to said mating surface, wherein said second angle of inclination is greater than said first angle of inclination, said protrusions being adapted to be received into said recesses formed in said mating surfaces of said ring-like plastic member in a tight fit wherein at least one of said recesses extends into said substantially flat mating surface of said first ring-like plastic member to a depth greater than the height to which said protrusion on said second ring-like member extends above its substantially flat mating surface and wherein a portion of said extending recess comprises inwardly tapering walls, said protrusion on said second ring-like plastic member being received into said recess of said first ring-like plastic member, and said first and second ring-like members being fastened by ultrasonic welding wherein a first ultrasonic weld fastens said second recess portion of said first ring-like plastic member to said first protrusion portion of said second ring-like plastic member, and wherein a second ultrasonic weld fastens the end of said protrusion of said second ring-like plastic member to said inwardly tapering walls of said first ring-like plastic member.

2. The retainer of claim 1 wherein said protrusions and said recesses are shaped substantially as cylinders.

3. The retainer of claim 1, wherein a portion of said protrusions and said recesses is conically tapered.

4. The retainer of claim 1 wherein portions of said protrusions and said recesses are shaped substantially as truncated cones.

5. The retainer of claim 1 wherein said protrusions and said recesses are shaped substantially as rectangeles in at least one cross-sectional dimension.

6. The retainer of claim 1 wherein said protrusions and said recesses are shaped substantially as squares in at least one cross-sectional dimension.

7. A method of making a retainer for a plurality of balls included in a ball bearing, said method including the steps of:
making a first ring-like plastic member wherein a plurality of cavities are formed by surfaces adapted to accommodate a ball, each of said ball-accommodating surfaces of said first member being connected to a neighoring such surface by a substantially flat mating surface, said substantially flat mating surface lying in a plane perpendicular to the major axis of said first ring-like element, a plurality of said substantially flat mating surfaces having a recess formed therein; wherein a first portion of said recess in substantially parallel to said mating surfaces and is recessed away from said mating surfaces to form a gap between said first recess portion and said mating surface; wherein a second portion of said recess is adjacent to said first recess portion, said second recess portion being inclined at a first acute angle of inclination with respect to the plane of said mating surfaces; wherein a third portion of said recess is adjacent to said second recess portion, said third recess portion being perpendicular to said mating surfaces; wherein a fourth portion of said recess is adjacent to said third recess portion, said fourth recess portion being inclined at a third angle of inclination with respect to the plane of said mating surfaces;

making a second ring-like plastic member wherein a plurality of cavities are formed by surface adapted to accommodate a ball, each of said ball-accommodating surfaces of said second member being connected to a neighboring such surface by a substantially flat mating surfaces, said substantially flat mating surface lying in a plane perpendicular to the major axis of said second ring-like elements, said second ring-like element having a protrusion formed on a plurality of said substantially flat mating surfaces of said second ring-like plastic member, said protrusion having a first portion adjacent to said mating surface, said first protrusion portion being inclined at a second acute angle of inclination with respect to the plane of said mating surface, wherein said second angle of inclination is greater than said first angle of inclination, said protrusions being adapted to be received into said recesses formed in said mating surface of said first ring-like plastic member in a tight fit;

placing said second ring-like plastic member in mating relation with said first ring-like plastic member so that said protrusions extend into corresponsing recesses in said first ring-like plastic member; and, securing said first ring-like plastic member and said second ring-like plastic member together ultasonic welding wherein a first ultasonic weld fastens said second recess portion of said first ring-like plastic member to said first protrusion portion of said second ring-like plastic member and wherein a second ultrasonic weld fastens the end of said protrusion of said second ring-like plastic member to said fourth recess portion of said first ring-like plastic member.

8. The method of claim 7, wherein said securing step includes using an adhesive to adhere said first ring-like plastic member to said second ring-like plastic member.

* * * * *